(12) United States Patent
Cui

(10) Patent No.: US 11,485,374 B2
(45) Date of Patent: Nov. 1, 2022

(54) SYSTEM AND METHOD FOR EVACUATION OF A VEHICLE IN CONDITION

(71) Applicant: Pony.ai, Inc., Fremont, CA (US)

(72) Inventor: Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 171 days.

(21) Appl. No.: 16/418,816

(22) Filed: May 21, 2019

(65) Prior Publication Data

US 2020/0369285 A1  Nov. 26, 2020

(51) Int. Cl.
| | |
|---|---|
| *B60W 50/00* | (2006.01) |
| *B60W 30/08* | (2012.01) |
| *B60W 40/04* | (2006.01) |
| *B60W 40/09* | (2012.01) |
| *B60W 40/06* | (2012.01) |

(52) U.S. Cl.
CPC ........ *B60W 50/0097* (2013.01); *B60W 30/08* (2013.01); *B60W 40/04* (2013.01); *B60W 40/06* (2013.01); *B60W 40/09* (2013.01); *B60W 50/0098* (2013.01); *B60W 2050/0017* (2013.01); *B60W 2050/0075* (2013.01); *B60W 2556/10* (2020.02); *B60W 2556/50* (2020.02)

(58) Field of Classification Search
CPC ..... B60W 30/0956; B60W 2040/0818; B60W 2050/0089; B60W 40/06; B60W 2050/0095; B60W 2556/10; B60W 60/007; B60W 60/0059
See application file for complete search history.

(56) References Cited

U.S. PATENT DOCUMENTS

| | | | |
|---|---|---|---|
| 9,703,289 B2 | 7/2017 | Sato et al. | |
| 9,891,625 B1 * | 2/2018 | Kahn | G05D 1/0214 |
| 2007/0198168 A1 | 8/2007 | Nathan et al. | |
| 2010/0174482 A1 * | 7/2010 | Sugawara | G01C 21/00 701/517 |
| 2017/0174227 A1 * | 6/2017 | Tatourian | G06K 9/3241 |
| 2017/0192437 A1 * | 7/2017 | Bier | G05D 1/0016 |
| 2018/0120837 A1 * | 5/2018 | Regmi | A61B 5/01 |
| 2019/0301891 A1 * | 10/2019 | Rowitch | G01C 21/32 |

(Continued)

FOREIGN PATENT DOCUMENTS

| | | | | |
|---|---|---|---|---|
| DE | 102016218382 A1 * | 3/2018 | | G08B 25/016 |
| WO | WO-2015134425 A1 * | 9/2015 | | G08G 1/0129 |
| WO | WO-2017002471 A1 * | 1/2017 | | G05D 1/0231 |

OTHER PUBLICATIONS

Tetzel, Stephen; How to Measure Particulate Matter with a Raspberry Pi; 2018; opensource.com; pp. 1 and 8 (Year: 2015).*

(Continued)

*Primary Examiner* — Aniss Chad
*Assistant Examiner* — Chase L Cooley
(74) *Attorney, Agent, or Firm* — Sheppard Mullin Richter & Hampton LLP

(57) ABSTRACT

Provided herein is a system and method adapted for a vehicle to evacuate from a condition. The system comprises a detection system configured to detect a condition. The system further comprises a control system configured to determine whether to evacuate the vehicle in response to the detection system detecting the condition, select a mode of evacuation to evacuate the vehicle away from the condition, and evacuate the vehicle away from the condition according to the mode of evacuation.

19 Claims, 10 Drawing Sheets

(56) References Cited

U.S. PATENT DOCUMENTS

2019/0316919 A1\* 10/2019 Keshavamurthy ............................
                                                        G08G 1/096838
2020/0124439 A1\*  4/2020 Fowe ................. G01C 21/3658
2020/0200558 A1\*  6/2020 Xu .................... G08G 1/096822

OTHER PUBLICATIONS

DCNR; Visibility Range as a Tool for Estimating Air Quality; 2012; NDEP; Rev 2012; pp. 1-2 (Year: 2012).\*

W.J., Groot; Interpreting the Canadian Forest Fire Weather Index (FWI) System; 1987; Canadian Forest Service Publications; pp. 1-3 and 6 (Year: 1987).\*

\* cited by examiner

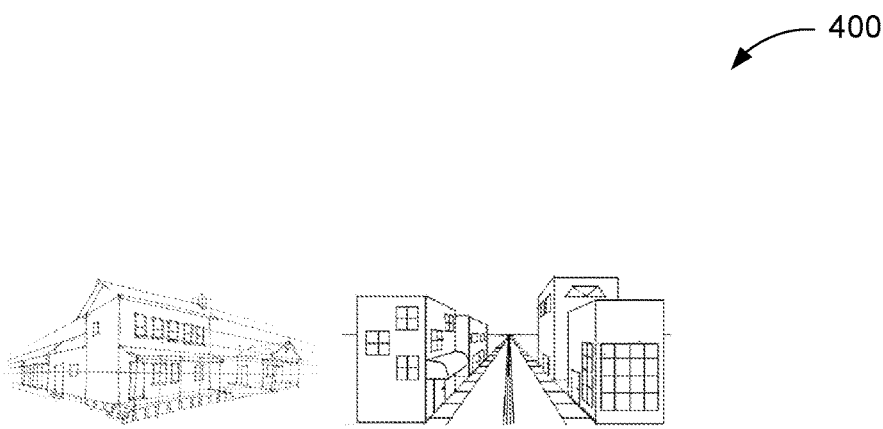

| Coordinates 37.44, -122.16 | | | | | |
|---|---|---|---|---|---|
| Historical data | | | | | |
| Historical speed data | Average speed of vehicle: 20 mph | | | | |
| Historical environment data | Average air quality index (AQI): 80 | | | | |
| Previous evacuations | First evacuation: 12/17/2015 5:00 PT | Successful | Mode of evacuation: Move to destination | Condition detected: environment, AQI=200 | Immediate Evacuation? Yes |
| | Destination of evacuation: 37.45, -122.18 | Detected speed at destination: 40 mph | Air quality index (AQI) at destination: 70 | | |

FIG. 4

SYSTEM AND METHOD FOR EVACUATION OF A VEHICLE IN CONDITION

TECHNICAL FIELD

The present disclosure relates generally to vehicles such as assisted-driving vehicles or autonomous vehicles (AVs), and in particular, some embodiments relate to detecting a condition, e.g., on a road, and evacuating from the condition.

BACKGROUND

Assisted-driving vehicles and AVs provide the potential advantages of decreasing traffic collision caused by human errors, such as those caused by delayed reaction time, tailgating, drinking and driving, speeding, distractions, and aggressive driving. Assisted-driving vehicles and AVs continue to advance with enhanced driving control systems and safety mechanisms to ensure the reliability and safety of such vehicles. Applications of assisted-driving vehicles and AVs include blind spot detection, lane change assisting, read end radar for collision warning or collision avoidance, park assisting, cross-traffic monitoring, brake assisting, emergency braking, and/or automatic distance controlling.

Additionally, assisted-driving vehicles and AVs may be especially useful in maneuvering away from a condition, e.g., on a road. Assisted-driving vehicles and AVs may detect a condition early on and safely and efficiently evacuate away from the condition to ensure the safety of a driver, passengers, and the vehicle itself.

SUMMARY

Described herein are systems and methods for detecting a condition, e.g., on a road, and evacuating from the condition, that are safer, faster, and more energy efficient. Various embodiments of the present disclosure provide a system adapted for a vehicle to evacuate from a condition. The system comprises a detection system configured to detect a condition. The system further comprises a control system configured to determine whether to evacuate the vehicle in response to the detection system detecting the condition. The control system is further configured to select a mode of evacuation to evacuate the vehicle away from the condition in response to determining that the vehicle is to be evacuated. The system is further configured to evacuate the vehicle away from the condition according to the mode of evacuation in response to selecting the mode of evacuation.

In some embodiments, the detection system is further configured to determine a type or a seriousness of the condition. In some embodiments, the control system is configured to determine whether to evacuate the vehicle based on the determined type or the determined seriousness of the condition.

In some embodiments, the control system is configured to select the mode of evacuation based on the determined type or the determined seriousness of the condition, in response to determining that the vehicle is to be evacuated.

In some embodiments, the system further comprises a memory accessible by the detection system and the control system. In some embodiments, the memory includes historical data at specific locations, historical speed data at the specific locations, a historical environment condition at the specific locations, or one or more results of previous evacuations, each of the one or more results indicating whether a previous evacuation was successful, a mode of evacuation used in the previous evacuation, a time of the previous evacuation, a destination location of the previous evacuation, a load consumption of the previous evacuation, or a duration of the previous evacuation.

In some embodiments, the detection system is further configured to access the memory to retrieve historical data at a current location, historical speed data at the current location, a historical environment condition at the current location, or the one or more results of previous evacuations. In some embodiments, the determining the type or the seriousness of the condition at the current location is based on a comparison of current data with the historical data at the current location. In some embodiments, the determining the type or the seriousness of the condition at the current location is based on a comparison of current speed data with the historical speed data at the current location. In some embodiments, the determining the type or the seriousness of the condition at the current location is based on a comparison of a current environment condition with the historical environment condition at the current location.

In some embodiments, the detection system is further configured to access the memory to retrieve historical data at a current location, historical speed data at the current location, a historical environment condition at the current location, or the one or more results of previous evacuations. In some embodiments, the detection system is further configured to determine a probability of the condition at the current location based on a comparison of current data with the historical data at the current location, a comparison of current speed data with the historical speed data at the current location, or a comparison of a current environment condition with the historical environment condition at the current location.

In some embodiments, the detection system is further configured to determine whether the one or more results of previous evacuations exist in the memory. In some embodiments, the control system is configured to select the mode of evacuation based on the one or more results of previous evacuations, in response to the one or more results of previous evacuations being determined to exist. In some embodiments, the control system is configured to select the mode of evacuation based on a comparison of current data with historical data at a current location, a comparison of current speed data with historical speed data at the current location, or a comparison of a current environment condition with a historical environment condition at the current location, in response to the one or more results of previous evacuations being determined not to exist.

In some embodiments, the control system is configured to select the mode of evacuation by determining whether to move to a side of a road or exit from a highway. In response to the control system determining not to move to a side of road or to exit from the highway, the control system is configured to select a destination location from among destination locations based on the one or more results of previous evacuations accessed from the memory.

In some embodiments, the control system is configured to select the destination location from among the destination locations based on a proximity, a safety, or an accessibility of each of the destination locations.

In some embodiments, the control system is configured to select the mode of evacuation by selecting from one of moving to a side of a road, exiting from a highway, and moving away from the condition to a destination location.

Various embodiments of the present disclosure provide a method for evacuating a vehicle from a condition. The method comprises, detecting, by a detection system, a condition. The method comprises, determining, by a control system, whether to evacuate the vehicle in response to the detection system detecting the condition. The method comprises, selecting, by the control system, a mode of evacuation to evacuate the vehicle away from the condition in response to determining that the vehicle is to be evacuated. The method comprises, evacuating, by the control system, the vehicle away from the condition according to the mode of evacuation, in response to selecting the mode of evacuation.

In some embodiments, the method comprises, determining, by the detection system, a type or a seriousness of the condition. In some embodiments, the method comprises, determining, by the control system, whether to evacuate the vehicle based on the determined type or the determined seriousness of the condition.

In some embodiments, the selecting the mode of evacuation is based on the determined type or the determined seriousness of the condition, in response to determining that the vehicle is to be evacuated.

In some embodiments, the method further comprises, accessing, by the detection system and the control system, a memory. In some embodiments, the memory includes historical data at specific locations, historical speed data at the specific locations, a historical environment condition at the specific locations, or one or more results of previous evacuations. Each of the one or more results indicate whether a previous evacuation was successful, a mode of evacuation used in the previous evacuation, a time of the previous evacuation, a destination location of the previous evacuation, a load consumption of the previous evacuation, or a duration of the previous evacuation.

In some embodiments, the method further comprises, determining, by the detection system, a type or a seriousness of the condition at a current location. In some embodiments, the determining the type or the seriousness of the condition at the current location is based on a comparison of current data with historical data at the current location, a comparison of current speed data with historical speed data at the current location, or a comparison of a current environment condition with a historical environment condition at the current location.

In some embodiments, the method further comprises, determining a probability of the condition at a current location. In some embodiments, the determining the probability of the condition at a current location is based on a comparison of current data with historical data at the current location, a comparison of current speed data with historical speed data at the current location, or a comparison of a current environment condition with a historical environment condition at the current location. In some embodiments, the method further comprises, selecting, by the control system, the mode of evacuation based on the determined probability of the condition.

In some embodiments, the method further comprises, determining, by the detection system, whether the one or more results of previous evacuations exist in the memory. In some embodiments, the method further comprises, in response to the one or more results of previous evacuations being determined to exist, selecting, by the control system, the mode of evacuation based on the one or more results of previous evacuations. In some embodiments, the method further comprises, in response to the one or more results of previous evacuations being determined not to exist, selecting, by the control system, the mode of evacuation based on a comparison of current data with historical data at a current location, a comparison of current speed data with historical speed data at the current location, or a comparison of a current environment condition with a historical environment condition at the current location.

In some embodiments, the selecting the mode of evacuation is conducted by determining whether to move to a side of a road or exit from a highway. In some embodiments, the selecting the mode of evacuation is conducted by selecting a destination location from among destination locations based on the one or more results of previous evacuations accessed from the memory, in response to the control system determining not to move to the side of the road or to exit from the highway.

In some embodiments, the selecting the destination location is conducted by selecting from among the destination locations based on a proximity, a safety, or an accessibility of each of the destination locations.

In some embodiments, the selecting the mode of evacuation is conducted by selecting from one of moving to a side of a road, exiting from a highway, and moving away from the condition to a destination location.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4 depicts an example of a memory according to some embodiments.

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments of the present disclosure provide systems and methods for a vehicle, such as an AV or assisted driving vehicle, to evacuate from a condition. The embodiments provide effective and efficient systems and methods which minimize a computation load of the system while effectively ensuring detection of a condition and implementing evacuation of the vehicle.

Figure 1:
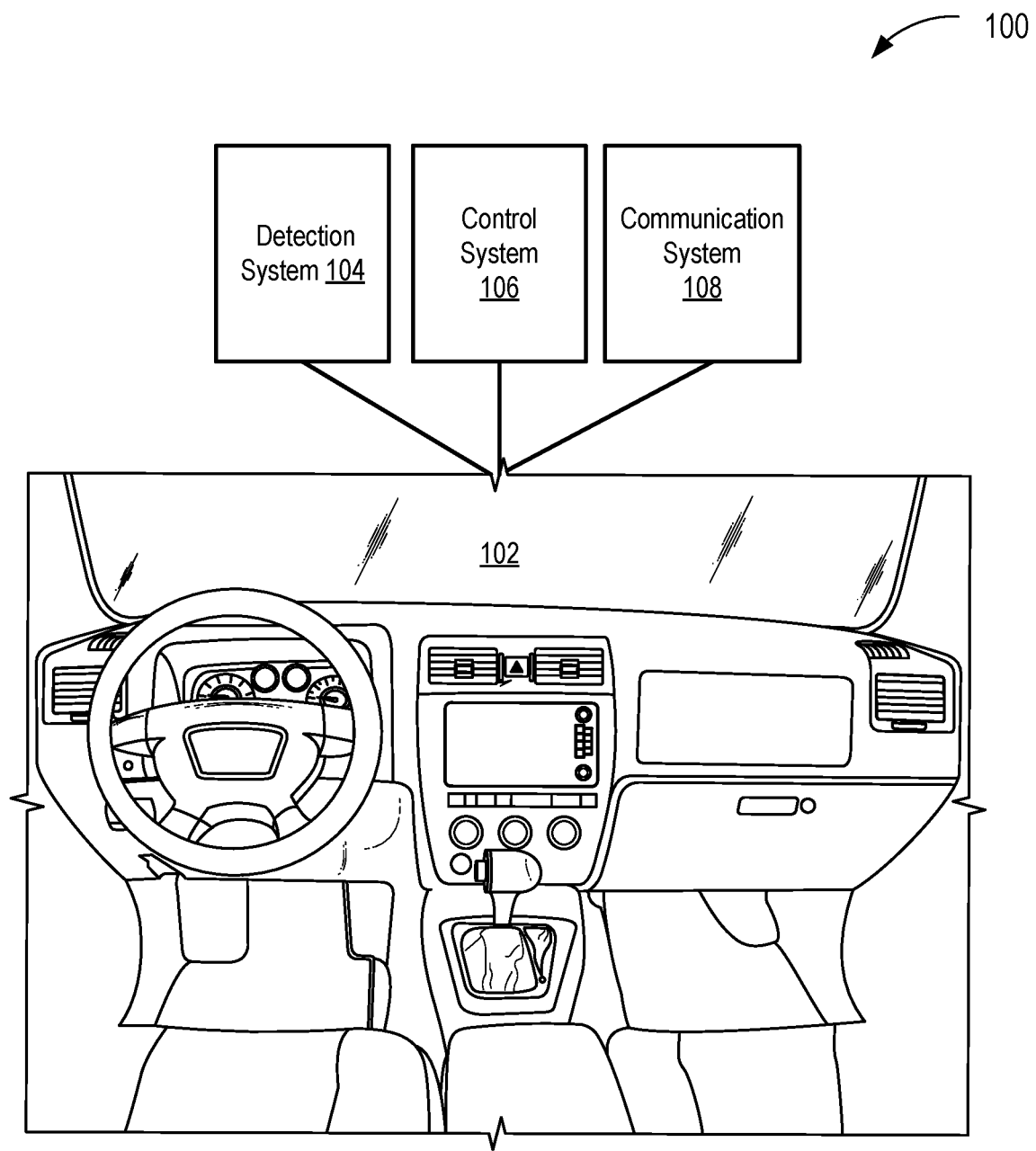
FIG. 1 depicts a diagram of an example system for a vehicle to evacuate from a condition according to some embodiments.

Various embodiments described herein are directed to a system and a method for a vehicle, such as an AV or assisted driving vehicle, to evacuate from a condition. FIG. 1 depicts a diagram 100 of an example system for a vehicle to evacuate from a condition, according to some embodiments. In the example of FIG. 1, the system includes a vehicle 102, a detection system 104, a control system 106, and a communication system 108. In various embodiments, the systems 104-108 are implemented as part of the vehicle 102. The vehicle 102 may be capable of sensing its environment and/or navigating with a limited human input or without human input. The vehicle 102 discussed in this paper typically includes a vehicle that travels on the ground (e.g., car, truck, bus, bicycle, train, tram), but may also include a vehicle that travels in the air (e.g., drones, helicopter, airplanes), travels on water (e.g., a boat), travels in space (e.g., spacecraft), and/or the like. The vehicle 102 discussed in this paper may or may not accommodate one or more passengers therein.

The detection system 104 may be configured to detect a condition. For example, a condition may refer to road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack of an occupant) or other emergencies (e.g., robbery or shooting) that may impact driving decision, such as a decision to switch between manual and autonomous driving mode, change driving speed or direction, without limitation. The condition, in some embodiments, may warrant evacuation from a current location. The detection system 104 may be configured to detect a condition by selectively capturing sensor data and processing and/or analysis of the sensor data.

The detection system 104 may be mounted on one or more portions (e.g., exterior surfaces, interior surfaces) of a vehicle 102, and may include a sensor, or one or more sensors. As used herein, sensors may include laser scanning systems (e.g., Lidar systems), radar systems, cameras, GPS, sonar, ultrasonic, IMU, accelerometers, gyroscopes, magnetometers, and FIR (far infrared) sensors and/or the like. Cameras and other optical sensors may capture sensor data, such as image data, using charge coupled devices (CCDs), complementary metal oxide semiconductors (CMOS), or similar elements. Radar systems and laser scanning systems may identify objects in the vicinity of the vehicle 102. The sensor data, or image data, may include an image captured from the one or more sensors, or one or more specific features (such as other vehicles, trees, road, grass, landmarks, people, inanimate objects) extracted from the image.

In some embodiments, the detection system 104 may compare the sensor data (e.g., image data) with historical data. Historical data may refer to, as an example, an image, or one or more specific features of the image. The image (e.g., of the historical data) may be captured at a specific location, for example, taken at a same location as the sensor data. Historical data may be information already verified to be accurate. Historical data may be images from other sensors and/or onboard 3D map data. As an example, the detection system 104 may determine how closely the sensor data matches with the historical data as a basis for determining whether a condition exists. As an example, how closely the sensor data matches with the historical data may be based on a proportion of features present in the historical data that are also in common with the sensor data, or, of the features that are in common between the historical data and the sensor data, how closely each of the features matches (e.g. a degree of similarity between each of the features).

In some embodiments, the detection system 104 may be configured to determine a proportion of the one or more features of the sensor data that matches the one or more features of the historical data and determine whether the proportion is less than a threshold (e.g., first threshold). For example, the detection system 104 may determine whether one or more common feature(s) (such as another vehicle, person, construction site, roadblock, sign) is present in both the sensor data and the historical data, of the features that are present in the sensor data. If the proportion is less than the first threshold, the detection system 104 may determine that a condition exists, or, that further testing is desired to determine whether a condition exists. In other embodiments, in addition or in place of determining whether the proportion is less than the first threshold, the detection system 104 may determine a degree of similarity of individual features between the sensor data and the historical data. For example, of the features of the sensor data that matches the one or more features of the historical data, the detection system 104 may select one, some, or all of the aforementioned matching features, and determine how closely each of the selected feature(s) matches between the sensor data and the historical data (e.g. a degree of similarity between each of the features). If each of the selected feature(s) matches sufficiently between the sensor data and the historical data, the detection system 104 may determine that the condition is absent, or fails to exists. If some or all of the selected features(s) does not sufficiently match between the sensor data and the historical data, the detection system 104 may determine that further testing is desired of whether a condition exists, or that the condition exists.

For example, if one, some, or all of the features of the historical data exhibits a similarity with the sensor data of greater than a threshold (e.g. second threshold), the detection system 104 may determine that no condition exists. In some embodiments, if the similarity is less than a second threshold, the sensor system 104 may determine that a condition exists, or that further testing may be desired to determine whether a condition exists. In some embodiments, if the similarity is between a second and third threshold, the detection system 104 may determine that further testing may be desired to determine whether a condition exists. For example, further testing may be done on the basis of second data taken at a different time and/or by a different sensor, or based on other readings or data generated or processed by the one or more sensors.

The sensor or the one or more sensors, of the detection system 104, may also detect vehicle speed, vehicle direction, vehicle acceleration, vehicle rotation, vehicle location, road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack) or other emergencies (e.g., robbery or shooting). Readings and/or data from the sensor or the one or more sensors may be verified by readings and/or data from the same sensor at a different time, or another sensor of a same or different modality at a same time or a different time. Readings and/or data may be captured by the sensor or the one or more sensors in a continuous sampling manner.

For example, the sensor data may include information indicative of traffic or a density of vehicles on a road, an average speed of vehicles, an air quality index (AQI), and the like. The detection system 104 may periodically or continuously obtain sensor data. For example, the detection system 104 may obtain sensor data at a first frequency or sampling rate. Upon determining that one or more of the sensor data is outside of an allowable range (such as an upper and/or lower threshold) the detection system 104 may increase the sampling rate, for example, to a second frequency.

The detection system 104 may further process the sensor data, if necessary, to determine an existence of a road condition (e.g., traffic accident, traffic congestion, or road failure, construction, detour, road block, bumpy road, or an additional road sign), environment condition (e.g., fire, explosion, flood, or earthquake, pollution, smog, tornado, monsoon), health condition (e.g., stroke or heart attack) or other emergency (e.g., robbery or shooting). For example, the detection system 104 may obtain information from an image at a current location, extract features from the image, and/or conduct processing of the image, to obtain statistics (e.g. real-time statistics) such as a density of vehicles, an average speed of other vehicles, measure of congestion, or density of features on the road. The sensor data may also be processed to obtain an image histogram of a graphical representation of tonal distribution in an image.

The detection system 104 may use the real-time statistics obtained as a basis to determine whether a condition (e.g., road condition, environment condition, health condition or other emergency) exists. The real-time statistics (e.g., air quality index) may be measured directly from the one or more sensors or obtained from processing the sensor data (e.g. image data). For example, the detection system 104 may determine whether one or more of the real-time statistics is within an allowable range, or if one or more of the real-time statistics is above or below a threshold (e.g. fourth threshold or fifth threshold). If the detection system 104 determines that the one or more of the real-time statistics is within the allowable range, the detection system 104 may not detect a condition. If the detection system 104 determines that the one or more of the real-time statistics is not within the allowable range, the detection system 104 may detect a condition. For example, if the detection system 104 determines that a density of vehicles at the current location is greater than a threshold (e.g. fourth threshold) or otherwise not within an allowable range, the detection system 104 may detect a condition. As another example, the detection system 104 may detect a condition only if more than one of the real-time statistics is not within an allowable range. For example, the detection system 104 may detect a condition if both the density of vehicles is above a fourth threshold and the air quality index is above a threshold (e.g. fifth threshold), but may not detect a condition, if only one of the density of vehicles or the air quality index is above its respective thresholds.

The allowable ranges or thresholds (e.g. first through fifth thresholds, and so on) may be based on historical data at specific locations. For example, a threshold (e.g. sixth threshold) of historical speed data may be set or determined based on previous speed data at a specific location, such as an average vehicle speed at the specific location measured from the same vehicle 102 or from other vehicles. The detection system 104 may compare a current speed data of the vehicle 102 or other vehicles at a current location with the historical speed data at the current location, and/or determine whether the current speed data is greater than a sixth threshold. The sixth threshold may be set or determined based on historical speed data at the specific location. For example, the sixth threshold may be set to 25 mph if the historical speed data is 30 mph at the current location, or may be set to 20 mph if the historical speed data is 25 mph at the current location. The historical speed data may be an average vehicle speed at the current location. The detection system 104 may determine whether a current environment condition (e.g. AQI) is above a threshold (e.g. seventh threshold). The seventh threshold may be set based on a historical environment condition (e.g. average of previous AQI readings at a current location). For example, the seventh threshold may be set to an AQI of 90 if an average of previous AQI readings at that location was 80, and the seventh threshold may be set to an AQI of 100 if an average of previous AQI readings at that location was 90.

In some embodiments, the detection system 104 further determines a type or a seriousness of a condition, or a probability of a condition. For example, a type of a condition may include, road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack) or other emergencies (e.g., robbery or shooting). The detection system 104 may detect a type of a condition by analysis or processing of sensor data. The detection system 104 may determine a type or a seriousness of the condition at the current location based on a comparison of current data with historical data at the current location, a comparison of the current speed data with historical speed data at the current location, or a comparison of a current environment condition with a historical environment condition at the current location. The detection system 104 may access a memory (e.g. detection system datastore 210) to retrieve the historical data at the current location, the historical speed data at the current location, or the historical environment condition at the current location.

For example, if the current speed data is lower than a threshold (e.g., sixth threshold) and a density of vehicles is higher than a threshold (e.g., fourth threshold), the detection system 104 may determine that the type of condition is traffic congestion. As another example, if the AQI is determined to be higher than a threshold (e.g., seventh threshold), the detected amount of smoke is determined to be above a threshold (e.g., eighth threshold), and a temperature is determined to be above a threshold (e.g., ninth threshold), the detection system 104 may determine that the type of condition is a fire. As another example, if a driver's heart rate is above a threshold (e.g., tenth threshold), the detection system 104 may determine that the type of condition is a health condition.

The detection system 104 may further determine a seriousness (e.g., severity) of a condition based on an amount of deviation of one or more of the sensor data from respective threshold values, and/or based on how many of the one or more of the sensor data are outside allowable ranges.

For example, the detection system 104 may determine a seriousness of a traffic congestion based on how much the current speed of the vehicle 102 or other vehicles deviates or differs from a threshold (e.g., sixth threshold), either alone, or in combination with how much a current density of vehicles deviates from a threshold (e.g., fourth threshold). The thresholds (e.g., fourth threshold, sixth threshold) may be location specific.

The detection system 104 may further determine a probability of a condition based on an amount of deviation of one or more of the sensor data from respective threshold values, and/or based on how many of the one or more of the sensor data are outside allowable ranges. The detection system 104 may further determine a probability of the condition at the current location based on a comparison of current data with the historical data at the current location, a comparison of the current speed data with the historical speed data at the current location, or a comparison of a current environment condition with the historical environment condition at the current location.

After completion of the evacuation, e.g., by the control system 106, the detection system 104 may determine whether the evacuation was successful, e.g., if it successfully moved the vehicle 102 away from the condition. The detection system 104 saves a result of the evacuation in a memory, e.g., detection system datastore 210.

In some embodiments, the control system 106 may be a module. In some embodiments, the control system 106 may determine whether to evacuate the vehicle 102 in response to the detection system 104 detecting the condition. In some embodiments, the control system 106 may select a mode of evacuation to evacuate the vehicle 102 away from the condition in response to determining that the vehicle 102 is to be evacuated. In some embodiments, the control system 106 may evacuate the vehicle 102 away from the condition according to the mode of evacuation in response to selecting the mode of evacuation.

In some embodiments, the control system 106 may determine whether to evacuate the vehicle 102 based on the determined type or the determined seriousness of the condition, or a combination of the determined type and the determined seriousness. For example, the control system 106 may determine to evacuate only if the detection system 104 determines an existence of certain types of conditions, such as a health condition or an environment condition, and/or to not evacuate if certain types of conditions are determined, such as a traffic congestion or traffic accident. As an example, the control system 106 may first determine whether the type of condition requires evacuation; for example, a health condition or an environment condition may require evacuation. If the control system 106 determines that the type of condition requires evacuation, the control system 106 may evacuate the vehicle 102. If the control system 106 determines that the type of condition does not require evacuation, the control system 106 may then determine whether to evacuate based on the determined seriousness of the condition. For example, the control system 106 may determine to evacuate if the condition is of at least a certain seriousness, and the control system 106 may determine not to evacuate if the condition is of less than a certain seriousness.

The control system 106, upon determining to evacuate the vehicle 102, may then select a mode of evacuation. In some embodiments, the control system 106 may select the mode of evacuation based on the determined type or the determined seriousness of the condition, in response to determining that the vehicle 102 is to be evacuated. In some embodiments, the control system 106 may select the mode of evacuation based on the determined probability of the condition. In some embodiments, the control system 106 may select the mode of evacuation based on one or a combination of the determined type, determined seriousness, required time of evacuation, and required system load of evacuation. The required time of evacuation may be a time required to complete evacuation of the vehicle 102. The required system load of evacuation may be the total load consumed or required by the system to perform the evacuation.

In some embodiments, the control system 106 may select the mode of evacuation by selecting from one of: moving to a side of a road, exiting from a highway, and moving away from the condition to a destination location. In some embodiments, the control system 106 may select the mode of evacuation by first determining whether to move to a side of a road. For example, the control system 106 may determine whether to move to the side of the road based on whether it is permitted by traffic laws, whether it is safe, and/or whether doing so successfully moves away from the condition. For example, the control system 106 may determine not to move to the side of the road if the vehicle 102 is driving on a highway. If the control system 106 determines to move to the side of the road, then the control system 106 performs the evacuation by moving the vehicle 102 to the side of the road. If the control system 106 determines not to move to the side of the road, the control system 106 may determine whether to exit from a highway, for example, at an exit or a rest area. For example, the control system 106 may determine whether to exit based on whether it is safe, a distance to the exit from the current location, and/or whether doing so successfully moves away from the condition. If the control system 106 determines to exit, the control system 106 performs the evacuation by selecting an exit and exiting. The control system 106 selects an exit based on a proximity of the exit and whether the exit successfully moves away from the condition. If the control system 106 determines not to exit, the control system 106 determines a destination location to evacuate. The control system 106 may determine a destination location based on a proximity, safety, accessibility, and/or a system load consumption of each of the destination locations.

In some embodiments, the control system 106 may select the mode of evacuation and/or choose a destination location based on one or more results or previous evacuations (e.g., stored in the detection system datastore 210) being determined to exist (e.g. by the detection system 104). For example, the control system 106 may select the mode of evacuation and/or choose a destination location based on one or more results or previous evacuations and/or previous destination locations being determined to exist specifically at the current location. For example, if no results of previous evacuations are determined to exist specifically at the current location, then the control system 106 may not use results of previous evacuations as a basis for selecting the mode. The control system 106 may select the mode of evacuation based on which previous mode had a highest success rate, either overall, or specifically corresponding to a particular type of condition and/or within a range of seriousness of the condition. For example, if the current location is determined to have a road condition of high seriousness, the control system 106 may select the mode of evacuation and/or the destination location based on previous evacuations caused specifically by road conditions of high seriousness, and choose the mode of evacuation that was most successful for that specific category. The control system 106 may alternatively or additionally select the mode of evacuation and/or the destination location based on the type of the condition, the seriousness of the condition, the distance from the current location to the destination location, and/or the system load required for the mode of evacuation. As an example, if the one or more results of previous evacuations are determined not to exist specifically at the current location, the control system 106 may select the mode of evacuation and/or the destination location based on a comparison of current data with historical data at the current location, a comparison of current speed data with historical speed data at the current location, or a comparison of one or more current environment conditions with a historical environment condition at the current location. The control system 106 may select the mode of evacuation based on any combination of one or more of the aforementioned comparisons. For example, the control system 106 may select the mode of evacuation based on whether a deviation exists between one or more current environment conditions and one or more historical environment conditions at the current location, and an amount or amounts of the deviation. For example, if the deviation exists and the amount of the deviation or deviations is relatively high, the control system 106 may determine that simply moving to a side of a road or exiting does not sufficiently or successfully move the vehicle 102 away from the condition, so choosing a destination location far away may be desired.

If the detection system 104 determines that the evacuation attempted by the control system 106 was not successful, the control system 106 may select a second mode of evacuation to evacuate the vehicle 102. For example, if moving to a side of a road did not successfully move the vehicle 102 away from the condition, the control system 106 may select a destination location farther away. As another example, if selecting and moving to a destination location, by the control system 106, did not successfully move the vehicle 102 away from the condition, the control system 106 may select a destination location farther away.

The system 100 may further comprise a communication system 108. The communication system 108 may represent one or more computer networks (e.g., LAN, WAN, bus, or the like) or other transmission mediums. The communication system 108 may provide communication between the vehicle 102, systems 104-106 and/or other systems/engines described herein. The communication system 108 may further communicate with other nearby vehicles regarding the existence of a condition, the type of the condition, the seriousness of the condition, the mode of evacuation, and/or the destination location. In some embodiments, the communication system 108 includes one or more computing devices, routers, cables, buses, and/or other network topologies (e.g., mesh, and the like). In some embodiments, the communication system 108 may be wired and/or wireless. In various embodiments, the communication system 108 may include the Internet, one or more wide area networks (WANs) or local area networks (LANs), one or more networks that may be public, private, IP-based, non-IP based, and so forth.

Figure 2:
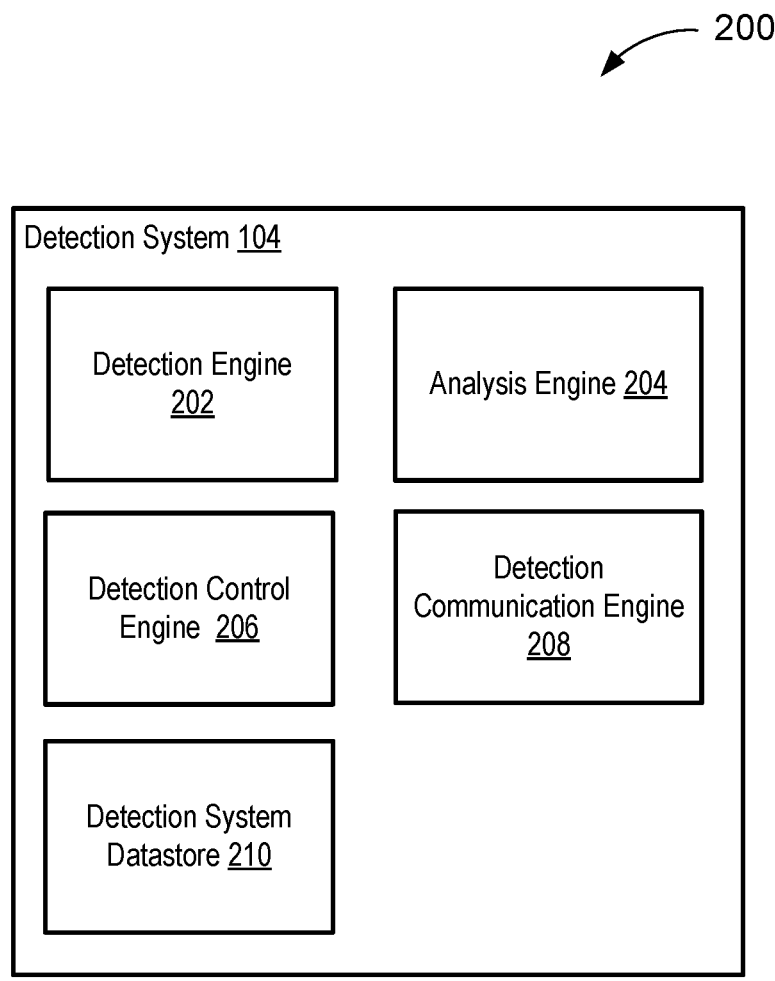
FIG. 2 depicts a diagram of an example of a detection system according to some embodiments.

FIG. 2 depicts a diagram 200 of an example of the detection system 104 according to some embodiments. In the example of FIG. 2, the detection system 104 includes a detection engine 202, an analysis engine 204, a detection control engine 206, a detection communication engine 208, and a detection system datastore 210.

The detection engine 202 may function to capture sensor data. The detection engine 202 may include one or more sensors. The sensors may include laser scanning systems (e.g., Lidar systems), radar systems, cameras, GPS, sonar, ultrasonic, IMU, and FIR (far infrared) sensors and/or the like.

In some embodiments, the sensors may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding a vehicle such as an autonomous vehicle (e.g., an autonomous vehicle the rotatable laser scanning system is mounted on), and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding the vehicle such as the autonomous vehicle.

In some embodiments, cameras may be mounted on the vehicle such as an AV to capture images (or, image data) of regions surrounding the vehicle. For example, the cameras may capture images in front of the vehicle, on the sides of the vehicle, above the vehicle, below the vehicle, and/or behind the vehicle.

The analysis engine 204 may be configured to determine whether one or more conditions exists (road conditions, environment conditions health conditions, or other emergencies) as described with respect to the detection system 104 in FIG. 1. The analysis engine 204 may be configured to determine a type and/or seriousness of the one or more conditions, or a probability of the one or more conditions, at the current location, as described with respect to the detection system 104 in FIG. 1. The analysis engine 204 may be configured to access a memory (e.g., detection system datastore 210). The analysis engine 204 may be configured to determine whether an evacuation is successful and save one or more results of each evacuation in the detection system datastore 210, as described with respect to the detection system 104 in FIG. 1.

The detection control engine 206 may function to control the detection engine 202 or the analysis engine 204. More specifically, the detection control engine 206 may function to control the one or more sensors of the sensor engine 202, and/or components of the sensor engine 202 or the analysis engine 204. In some embodiments, the detection control engine 206 may control a rotatable laser scanner system to selectively capture sensor data. Similarly, the detection control engine 206 may function to not capture certain sensor data. For example, the cameras may be powered off, controlled to not capture images, controlled to delete and/or not store captured images, and/or the like.

The detection communication engine 208 may function to send requests, transmit and, receive communications, and/or otherwise provide communication with one or a plurality of systems. In some embodiments, the detection communication engine 208 functions to encrypt and decrypt communications. The detection communication engine 208 may function to send requests to and receive data from one or more systems through a network or a portion of a network. Depending upon implementation-specified considerations, the detection communication engine 208 may send requests and receive data through a connection, all or a portion of which may be a wireless connection. The detection communication engine 208 may request and receive messages, and/or other communications from associated systems.

Communications may be stored at least temporarily (e.g., cached and/or persistently) in the detection system datastore 210. For example, a lookup table may be stored in the detection system datastore 210. As another example, the historical data, historical speed data, historical environment data, and/or thresholds (e.g., first threshold, second threshold, third threshold, fourth threshold, etc.) may be stored in the detection system datastore 210. In some embodiments, the detection system datastore 210 is a memory. As another example, a result of previous evacuations may be stored in detection system datastore 210). For example, the result of previous recalibrations may comprise whether the evacuation was successful or specific data of the evacuation, such as reason for the evacuation, whether it was caused by road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), or health conditions (e.g., stroke or heart attack) or other emergencies (e.g., robbery or shooting). The result of previous evacuations may further comprise coordinates of the current location, and coordinates of the destination location. The detection system datastore 210 may comprise results of previous evacuations organized by type or seriousness of condition that caused the evacuation, location, or mode of evacuation, or one or more of the aforementioned.

Figure 3:
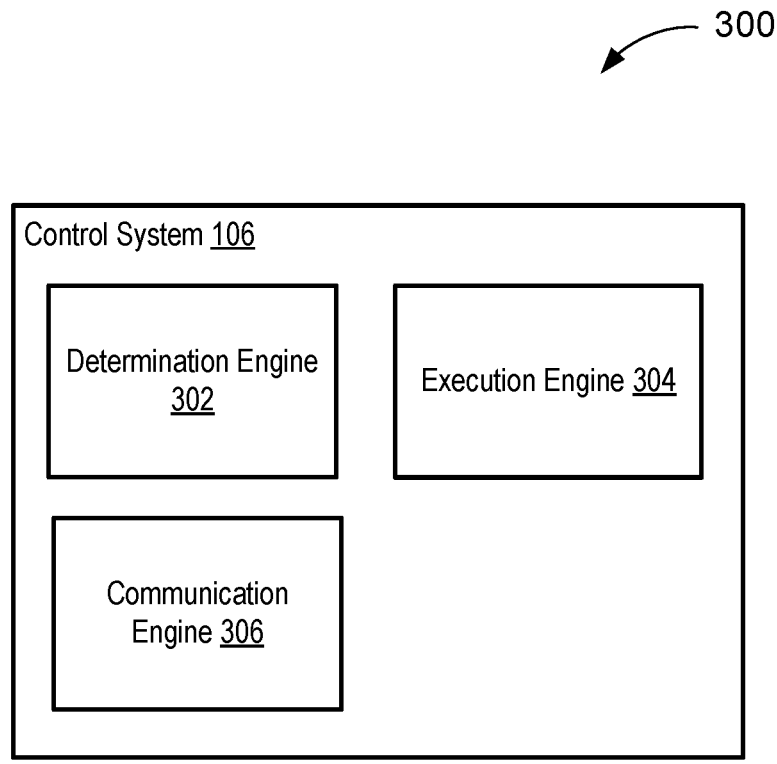
FIG. 3 depicts a diagram of an example of a control system according to some embodiments.

FIG. 3 depicts a diagram 300 of an example of a control system 106 according to some embodiments. In the example of FIG. 3, the control system 106 includes a determination engine 302, an execution engine 304, and a communication engine 308.

The determination engine 302 may function to determine which mode of evacuation to select, and/or a destination location, as described with respect to control system 106 in FIG. 1. In response to a determination that an evacuation was unsuccessful, the determination engine 302 may determine a different evacuation, as described with respect to control system 106.

The execution engine 304 may be configured to perform the specific mode or modes or evacuation as determined by the determination engine 302. The execution engine 304 may perform the specific mode of evacuation in a most efficient manner, e.g., that consumes least system load or resources. For example, the execution engine 304 may calculate or determine a least time consuming, and/or most efficient route to the destination location, based on current road conditions and/or environment conditions. In response to a determination that an evacuation was unsuccessful, the execution engine 304 may perform a different evacuation.

The communication engine 306 may function to send requests, transmit and, receive communications, and/or otherwise provide communication with one or a plurality of systems, e.g., between the determination engine 302 and the execution engine 304. In some embodiments, the communication engine 306 functions to encrypt and decrypt communications. The communication engine 306 may function to send requests to and receive data from one or more systems through a network or a portion of a network. Depending upon implementation-specified considerations, the communication engine 306 may send requests and receive data through a connection, all or a portion of which may be a wireless connection. The communication engine 306 may request and receive messages, and/or other communications from associated systems.

FIG. 4 depicts a memory 400, such as that of detection system datastore 210. The memory 400 may store historical data at specific locations, historical speed data at the specific locations, historical environment conditions at the specific locations, or one or more results of previous evacuations, each of the one or more results indicating whether a previous evacuation was successful, a mode of evacuation used in the previous evacuation, a time of the previous evacuation, a destination location of the previous evacuation, a load consumption of the previous evacuation, or a duration of the previous evacuation. The memory 400 may comprise one or more results of specific previous evacuations and a summary of results from all previous evacuations (e.g., at each of the specific locations). The memory 400 may organize the results of previous evacuations based on a type of condition and a seriousness of the condition. Description of the detection system datastore 210 is hereby incorporated to the memory 400.

Figure 5:
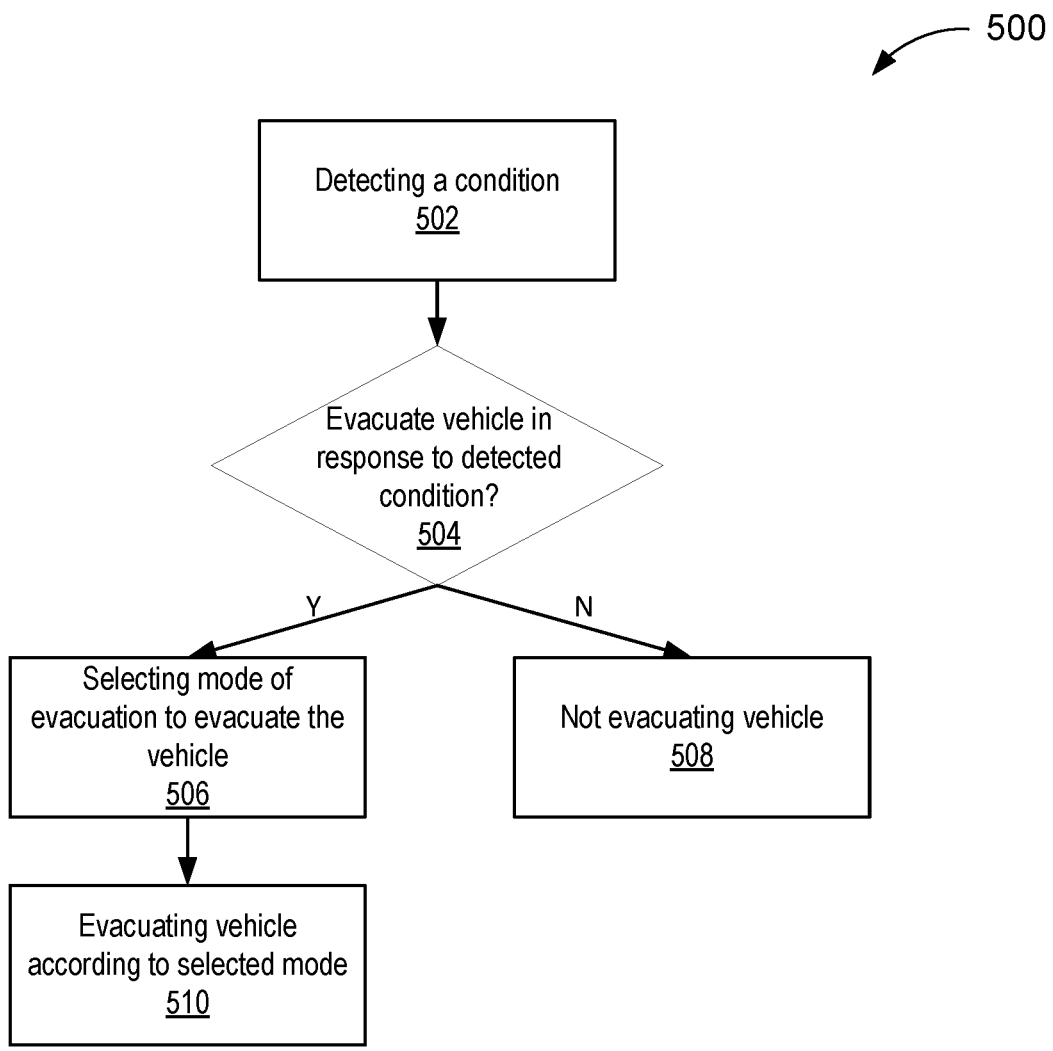
FIG. 5 depicts a flowchart of an example of a method for evacuating a vehicle from a condition according to some embodiments.

FIG. 5 depicts a flowchart of an example of a method for evacuating a vehicle from a condition according to some embodiments. In this and other flowcharts, the flowchart 500 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 5.

In step 502, a detection system (e.g., detection system 104) detects a condition. The condition may include road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack) or other emergencies (e.g., robbery or shooting). In decision 504, a control system (e.g., control system 106) determines whether to evacuate the vehicle (e.g., vehicle 102) in response to the detected condition. In step 506, in response to the control system determining to evacuate the vehicle, the control system selects a mode of evacuation. In step 508, which follows decision 504, in response to the control system determining not to evacuate the vehicle, the control system does not evacuate the vehicle. In step 510, which follows step 506, the control system evacuates the vehicle according to the selected mode.

Figure 6:
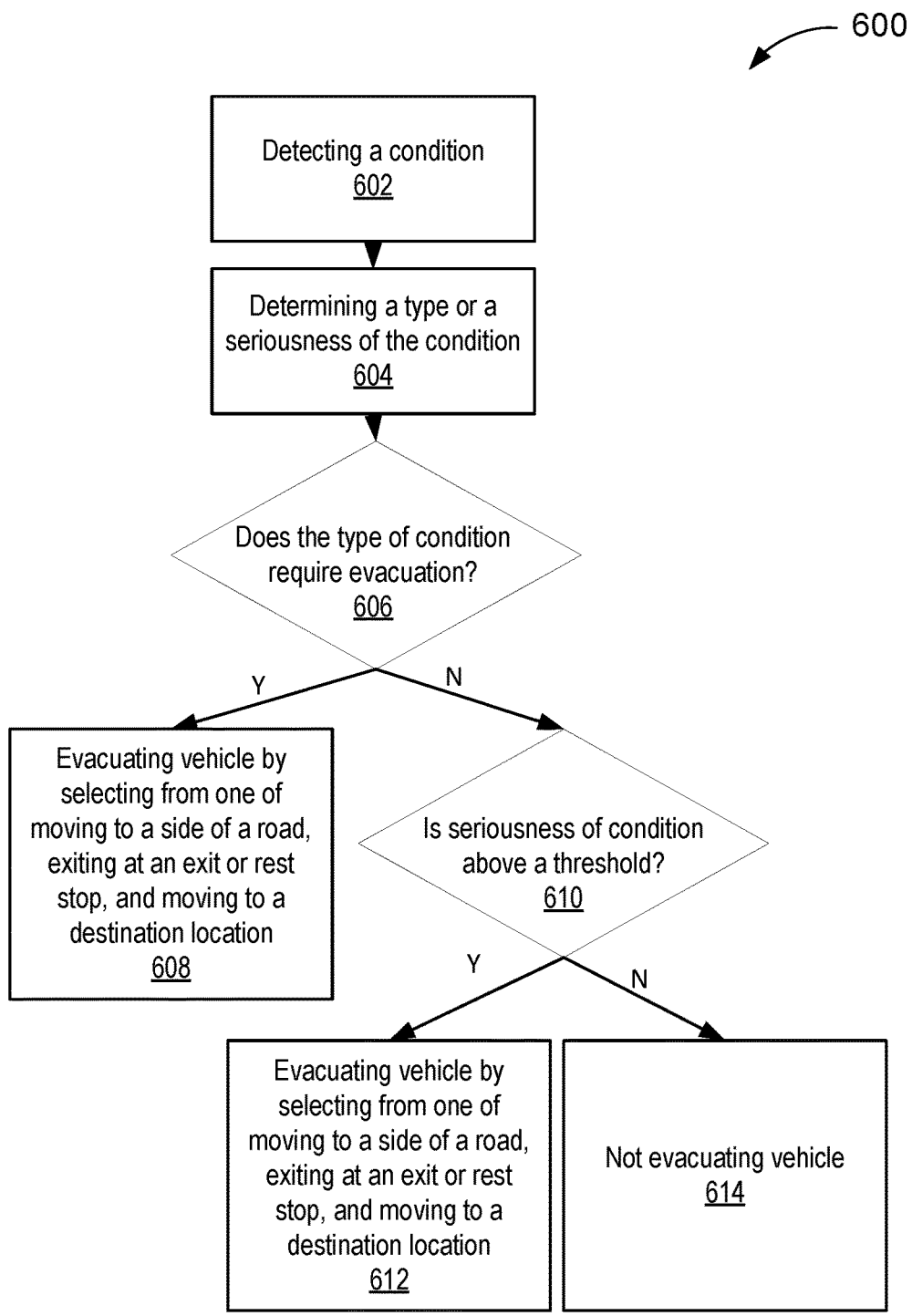
FIG. 6 depicts a flowchart of an example of a method for evacuating a vehicle from a condition according to some embodiments.

FIG. 6 depicts a flowchart of an example of a method for evacuating a vehicle from a condition according to some embodiments. In step 602, a detection system (e.g., detection system 104) detects a condition. The condition may include road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack) or other emergencies (e.g., robbery or shooting). In step 604, the detection system determines a type or a seriousness of the condition. In some embodiments, the detection system may determine both the type or the seriousness of the condition, or of one or more conditions. In decision 606, a control system (e.g., control system 106) determines whether the type of condition (e.g., environment condition, health condition) warrants or requires evacuation. In step 608, if the control system determines that the type of condition warrants or requires evacuation, the control system performs the evacuating of the vehicle (e.g., vehicle 102) by selecting one of: moving to a side of a road, exiting from a highway, and moving away from the condition to a destination location. In decision 610, which follows decision 606, if the control system determines that the type of condition does not warrant or require evacuation, the control system further determines whether a seriousness of the condition is above a threshold (e.g., if a level of severity or seriousness of the condition is high enough). In step 612, in response to the control system determining that the seriousness is above a threshold, the control system performs the evacuation by selecting one of: moving to a side of a road, exiting from a highway, and moving away from the condition to a destination location. In step 614, which follows decision 610, in response to the control system determining that the seriousness is not above a threshold, indicating that the condition is not serious enough, the control system does not evacuate the vehicle.

Figure 7:
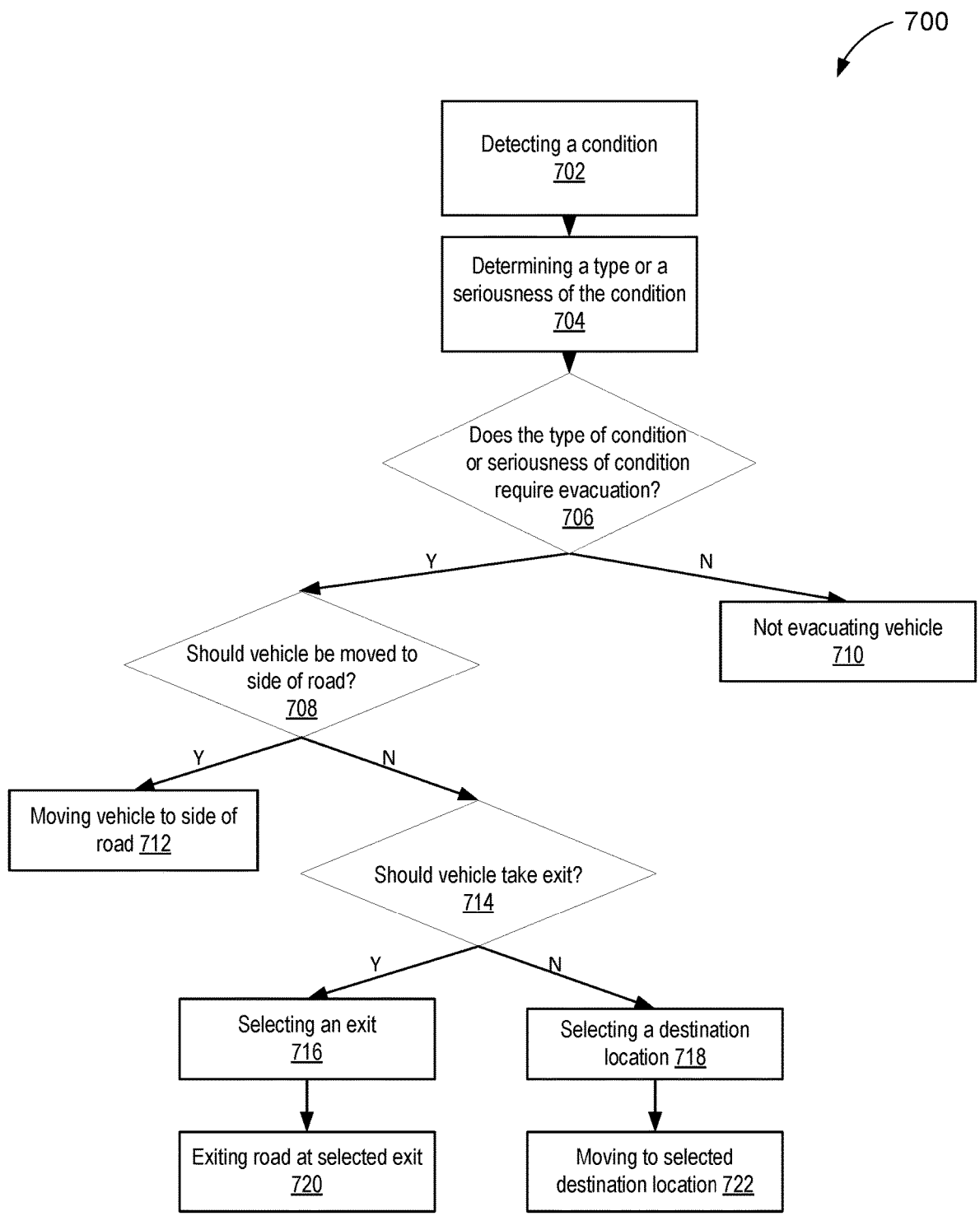
FIG. 7 depicts a flowchart of an example of a method for evacuating a vehicle from a condition according to some embodiments.

FIG. 7 depicts a flowchart of an example of a method for evacuating a vehicle from a condition according to some embodiments. In step 702, a detection system (e.g., detection system 104) detects a condition. The condition may include road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack) or other emergencies (e.g., robbery or shooting). In step 704, the detection system determines a type or a seriousness of the condition. In some embodiments, the detection system may determine both the type or the seriousness of the condition, or of one or more conditions. In decision 706, a control system (e.g., control system 106) determines, based on the type and/or the seriousness of the condition, whether evacuation is required. In decision 708, in response to the control system determining that evacuation is required, the control system determines whether the vehicle (e.g., vehicle 102) should be moved to a side of a road (e.g., based on whether traffic laws allow moving to the side of the road, whether the vehicle is sufficiently moved away from the condition, and/or safety). In step 710, which follows decision 706, in response to the control system determining that evacuation is not required, the control system does not evacuate the vehicle. In step 712, following decision 708, in response to the control system determining that the vehicle should be moved to the side of the road, the control system moves the vehicle to the side of the road. In decision 714, following decision 708, in response to the control system determining that the vehicle should not be moved to the side of the road, the control system determines whether the vehicle should exit from a highway. In step 716, in response to the control system determining that the vehicle should exit from the highway, the control system selects an exit (e.g. one that is sufficiently moved away from the condition, and based on proximity to the current location). In step 718, which follows decision 714, in response to the control system determining that the vehicle should not exit from the highway, the control system selects a destination location. In step 720, which follows step 716, the control system controls the vehicle to exit at the selected exit. In step 722, which follows step 718, the control system moves to the selected destination location.

Figure 8:
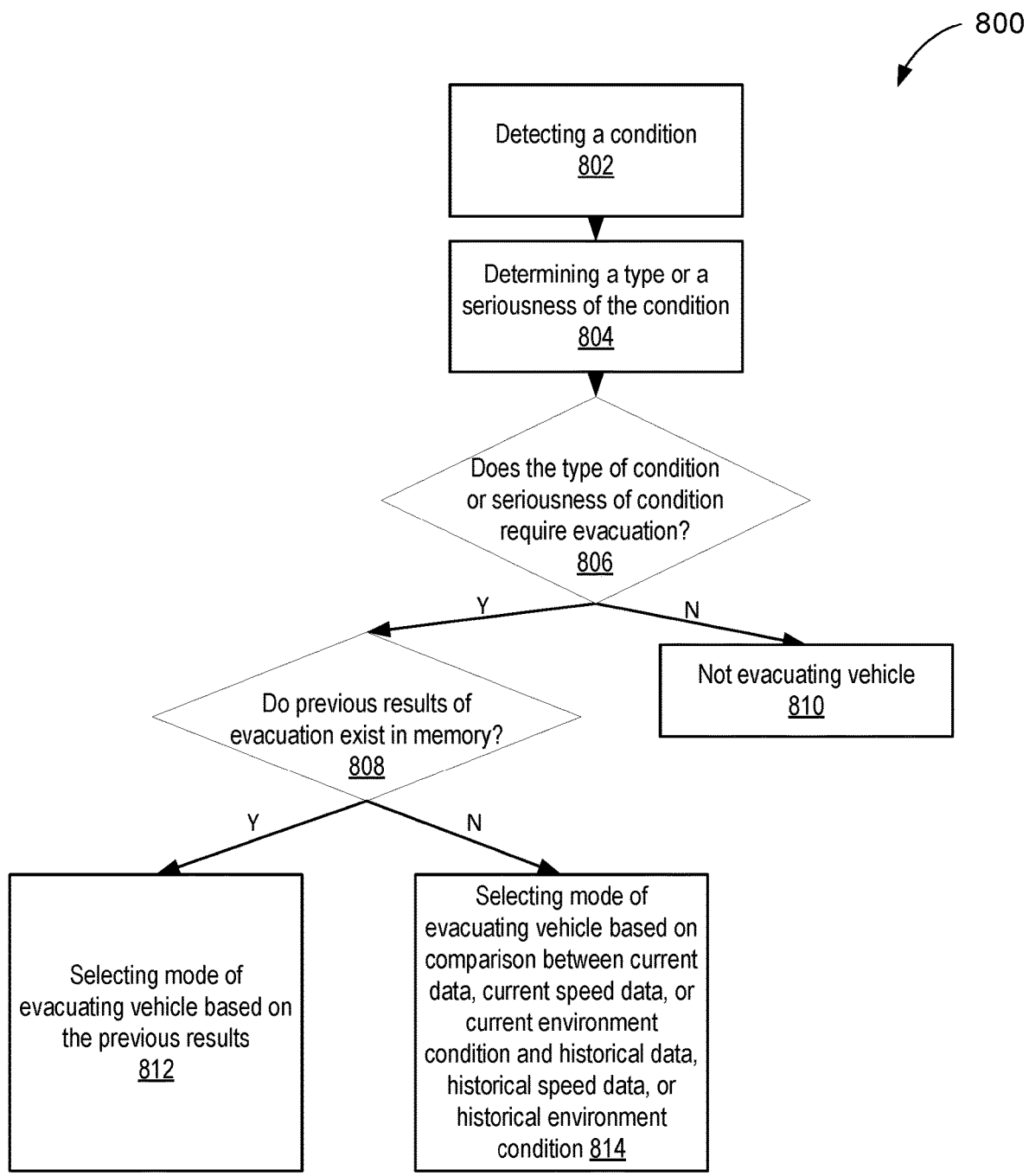
FIG. 8 depicts a flowchart of an example of a method for evacuating a vehicle from a condition according to some embodiments.

FIG. 8 depicts a flowchart of an example of a method for evacuating a vehicle from a condition according to some embodiments. In step 802, a detection system (e.g., detection system 104) detects a condition. The condition may include road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack) or other emergencies (e.g., robbery or shooting). In step 804, the detection system determines a type or a seriousness of the condition. In some embodiments, the detection system may determine both the type or the seriousness of the condition, or of one or more conditions. In decision 806, a control system (e.g., control system 106) determines, based on the type and/or the seriousness of the condition, whether evacuation is required. In decision 808, in response to the control system determining that evacuation is required, the detection system determines whether previous results of evacuation (e.g., at the current location) exist in memory (e.g., detection system datastore 210, or memory 400), and sends any previous results to the control system via a communication system (e.g., communication system 108). In step 810, following decision 806, in response to the control system determining that evacuation is not required, the control system does not evacuate the vehicle (e.g., vehicle 102). In step 812, following decision 808, in response to the control system determining that previous results of evacuation exist in the memory, the control system determines a mode of evacuation based on the previous results. In step 814, following decision 808, in response to the control system determining that no previous results of evacuation exist in the memory, the control system selects a mode of evacuation based on a comparison between current data, current speed data, or current environment conditions and historical data, historical speed data, or historical environment conditions, respectively. For example, the control system may select a mode of evacuation based on a series of comparisons including one or more of current data versus historical data, current speed data versus historical speed data, or current environment conditions versus historical environment conditions.

Figure 9:
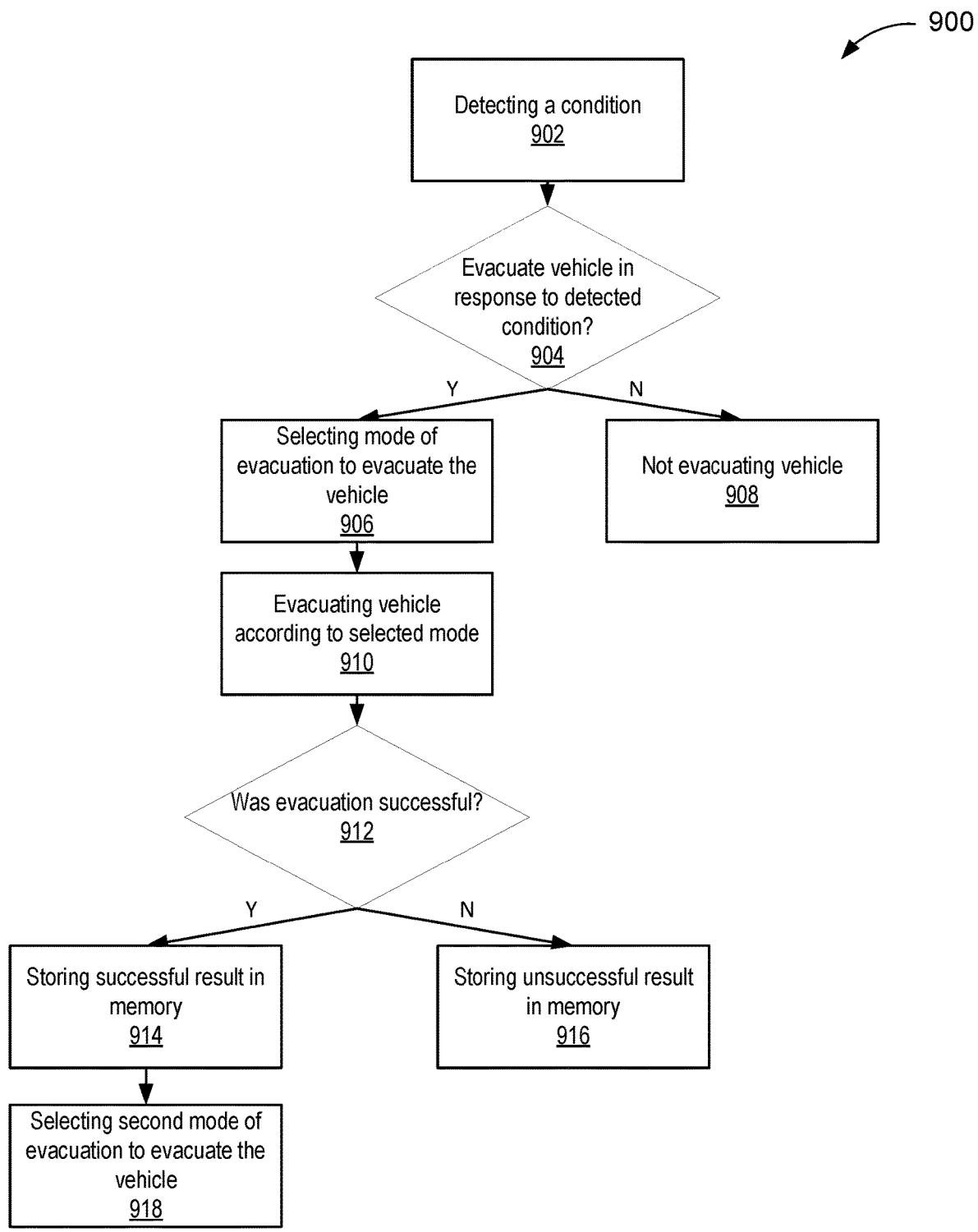
FIG. 9 depicts a flowchart of an example of a method for evacuating a vehicle from a condition according to some embodiments.

FIG. 9 depicts a flowchart of an example of a method for evacuating a vehicle from a condition according to some embodiments. In step 902, a detection system (e.g., detection system 104) detects a condition. The condition may include road conditions (e.g., traffic accident, traffic congestion, or road failure, construction, detour, road block, bumpy road, or an additional road sign), environment conditions (e.g., fire, explosion, flood, or earthquake, pollution, smog, tornado, monsoon), health conditions (e.g., stroke or heart attack) or other emergencies (e.g., robbery or shooting). In decision 904, a control system (e.g., control system 106) determines whether to evacuate the vehicle (e.g., vehicle 102) in response to the detected condition. In step 906, in response to the control system determining to evacuate the vehicle, the control system selects a mode of evacuation. In step 908, following decision 904, in response to the control system determining not to evacuate the vehicle, the control system does not evacuate the vehicle. In step 910, which follows step 906, the control system evacuates the vehicle according to the selected mode. In decision 912, the detection system determines whether the evacuation was successful. In step 914, in response to the detection system determining that the evacuation was successful, the detection system stores a result of the evacuation in memory (e.g. detection system datastore 210, memory 400). In step 916, which follows decision 912, in response to the detection system determining that the evacuation was not successful, the detection system stores a result of the unsuccessful evacuation in the memory. In step 918, which follows step 914, the control system selects a second mode of evacuation to evacuate the vehicle. For example, the second mode of evacuation may include selecting a destination location farther away from the condition.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
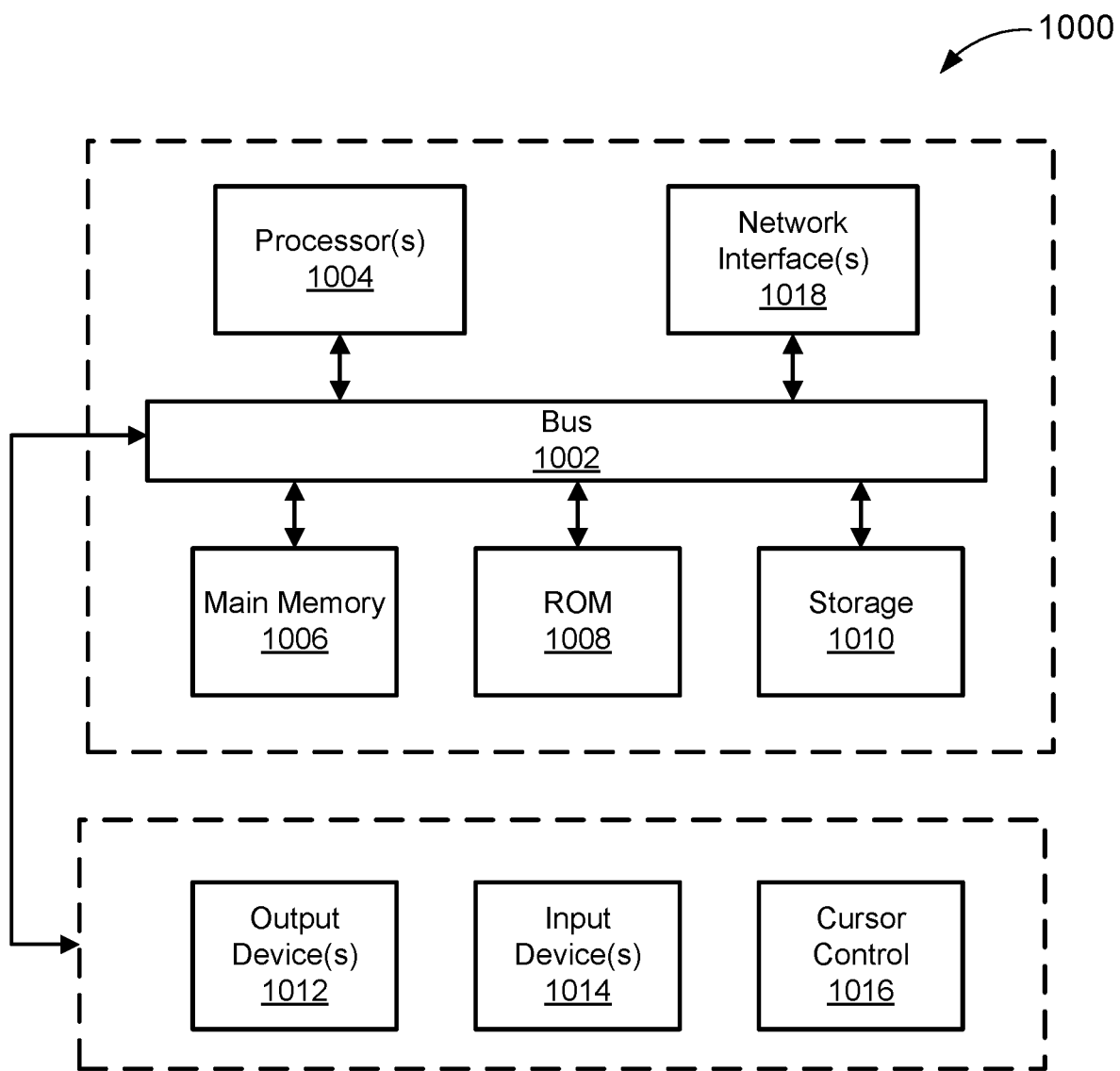
FIG. 10 is a diagram of an example computer system for implementing the features disclosed herein.

FIG. 10 is a block diagram that illustrates a computer system 1000 upon which any of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to output device(s) 1012, such as a cathode ray tube (CRT) or LCD display (or touch screen), for displaying information to a computer user. Input device(s) 1014, including alpha-numeric and other keys, are coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executed by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system adapted for a vehicle to evacuate from a condition, the system comprising:
   one or more processors; and
   memory storing instructions that, when executed by the one or more processors, cause the system to perform:
   acquiring, using a first camera, current sensor data at the current location;
   detecting a condition at a current location based on a proportion of matching features in the current sensor data that match historical features of historical sensor data at the current location, wherein the detection of the condition comprises:
   determining an existence of the condition in response to:
     the proportion being less than a first threshold proportion, and
     a degree to which a subset of the matching features in the current sensor data match corresponding historical features of the historical sensor data being less than a first threshold degree; determining an absence of the condition in response to:
     the proportion exceeding a second threshold proportion, and
     the degree exceeding a second threshold degree, wherein the second threshold proportion is greater than the first threshold proportion and the second threshold degree is greater than the first threshold degree; and
   performing additional testing using a second camera or other sensor to determine the existence or the absence of the condition in response to:
   the proportion being between the first threshold proportion and the second threshold proportion, or
   the degree being between the first threshold degree and the second threshold degree;
   comparing the features identified by the current sensor data to the corresponding features from historical data at the current location to determine a type and a seriousness of the condition;
   confirming the type and the seriousness of the condition using a Lidar sensor of a different modality, wherein the confirmation of the seriousness is based on an extent to which the density of vehicles deviates from a first threshold density based on a historical density of vehicles at the current location and an extent to which the average speed of other vehicles deviates from a second threshold speed, wherein:
   the threshold density is dynamically determined based on a historical density of vehicles at the current location, and
   the threshold speed is dynamically determined based on a historical average speed of other vehicles at the current location;
   determining whether to evacuate the vehicle in response to confirming the type and the seriousness of the condition;
   selecting a mode of evacuation to evacuate the vehicle away from the condition in response to determining that the vehicle is to be evacuated, based on:
     a mode of evacuation having a highest historical success rate in addressing a condition of the determined seriousness, and
     a time consumed to complete the mode of evacuation; and
   evacuating the vehicle away from the condition according to the mode of evacuation in response to selecting the mode of evacuation.

2. The system of claim 1, wherein the instructions further cause the system to perform:
   selecting the mode of evacuation based on the determined type of the condition, in response to determining that the vehicle is to be evacuated.

3. The system of claim 1, further comprising a datastore that stores data including historical data at specific locations, historical speed data at the specific locations, a historical environment condition at the specific locations, or one or more results of previous evacuations, each of the one or more results indicating whether a previous evacuation was successful, a mode of evacuation used in the previous evacuation, a time of the previous evacuation, a destination location of the previous evacuation, a load consumption of the previous evacuation, and a duration of the previous evacuation.

4. The system of claim 3, wherein the instructions further cause the system to perform:
   accessing the datastore to retrieve historical data at a current location, historical speed data at the current location, a historical environment condition at the current location, and the one or more results of previous evacuations; and
   determining a type or a seriousness of the condition at the current location based on a comparison of current data with the historical data at the current location, a comparison of current speed data with the historical speed data at the current location, and a comparison of a current environment condition with the historical environment condition at the current location.

5. The system of claim 3, wherein the instructions further cause the system to perform:
   accessing the datastore to retrieve historical data at a current location, historical speed data at the current location, a historical environment condition at the current location, and the one or more results of previous evacuations; and
   determining a probability of the condition at the current location based on a comparison of current data with the historical data at the current location, a comparison of current speed data with the historical speed data at the current location, and a comparison of a current environment condition with the historical environment condition at the current location; and
   selecting the mode of evacuation based on the determined probability of the condition.

6. The system of claim 3, wherein the instructions further cause the system to perform:
   determining whether the one or more results of previous evacuations exist in the memory; and selecting the mode of evacuation based on the one or more results of previous evacuations, in response to the one or more results of previous evacuations being determined to exist; and selecting the mode of evacuation based on a comparison of current data with historical data at a current location, a comparison of current speed data with historical speed data at the current location, and a comparison of a current environment condition with a historical environment condition at the current location, in response to the one or more results of previous evacuations being determined not to exist.

7. The system of claim 3, wherein the instructions further cause the system to perform:

determining whether to move to a side of a road or exit from a highway; and in response to determining not to move to a side of road or not to exit from the highway, selecting a destination location from among destination locations based on the one or more results of previous evacuations accessed from the datastore.

8. The system of claim 7, wherein the instructions further cause the system to perform:

selecting the destination location from among the destination locations based on a proximity, a safety, or an accessibility of each of the destination locations.

9. The system of claim 1, wherein the instructions further cause the system to perform:

refraining from evacuating if the determined type of condition is categorized as a traffic condition; and evacuating if the determine type of condition is categorized as a criminal activity.

10. The system of claim 1, wherein the comparison of features includes comparing an environmental condition indicative of a level of pollution in the current sensor data to a corresponding environmental condition of the historical data.

11. The system of claim 1, wherein the instructions further cause the system to perform:

increasing a sampling rate at which the current sensor data is acquired in response to determining that the current sensor data is outside of a threshold.

12. The system of claim 1, wherein the condition is further indicative of a smog level, and the sensor data comprises an air quality index (AQI).

13. The system of claim 1, wherein the condition is further indicative of an earthquake.

14. The system of claim 1, wherein the detecting of the condition further comprises determining the condition is a fire in response to an AQI exceeding a threshold and a detected amount of smoke exceeding a second threshold, and a detected temperature exceeding a third threshold.

15. The system of claim 1, wherein the detecting of the condition further comprises determining the condition is a health condition based on a heart rate of an occupant.

16. A method for evacuating a vehicle from a condition, the method comprising:

acquiring, using a first camera, current sensor data at the current location;

detecting a condition at a current location based on a proportion of matching features in the current sensor data that match historical features of historical sensor data at the current location, wherein the detection of the condition comprises:

determining an existence of the condition in response to: the proportion being less than a first threshold proportion, and a degree to which a subset of the matching features in the current sensor data match corresponding historical features of the historical sensor data being less than a first threshold degree;

determining an absence of the condition in response to:
the proportion exceeding a second threshold proportion, and the degree exceeding a second threshold degree, wherein the second threshold proportion is greater than the first threshold proportion and the second threshold degree is greater than the first threshold degree; and performing additional testing using a second camera or other sensor to determine the existence or the absence of the condition in response to:

the proportion being between the first threshold proportion and the second threshold proportion, or the degree being between the first threshold degree and the second threshold degree;

comparing the features identified by the current sensor data to the corresponding features from historical data at the current location to determine a type and a seriousness of the condition;

confirming the type and the seriousness of the condition using a Lidar sensor of a different modality, wherein the confirmation of the seriousness is based on an extent to which the density of vehicles deviates from a first threshold density based on a historical density of vehicles at the current location and an extent to which the average speed of other vehicles deviates from a second threshold speed, wherein:

the threshold density is dynamically determined based on a historical density of vehicles at the current location, and the threshold speed is dynamically determined based on a historical average speed of other vehicles at the current location;

determining whether to evacuate the vehicle in response to confirming the type and the seriousness of the condition;

selecting a mode of evacuation to evacuate the vehicle away from the condition in response to determining that the vehicle is to be evacuated, based on:

a mode of evacuation having a highest historical success rate in addressing a condition of the determined seriousness, and a time consumed to complete the mode of evacuation; and evacuating the vehicle away from the condition according to the mode of evacuation in response to selecting the mode of evacuation.

17. The method of claim 16, further comprising:

accessing a datastore that stores data, wherein the datastore includes historical data at specific locations, historical speed data at the specific locations, a historical environment condition at the specific locations, and one or more results of previous evacuations, each of the one or more results indicating whether a previous evacuation was successful, a mode of evacuation used in the previous evacuation, a time of the previous evacuation, a destination location of the previous evacuation, a load consumption of the previous evacuation, and a duration of the previous evacuation.

18. The method of claim 17, further comprising:

determining a probability of the condition at a current location based on a comparison of current data with historical data at the current location, a comparison of current speed data with historical speed data at the current location, and a comparison of a current environment condition with a historical environment condition at the current location; and selecting the mode of evacuation based on the determined probability of the condition.

19. The method of claim 17, further comprising:

determining whether the one or more results of previous evacuations exist in the datastore;

in response to the one or more results of previous evacuations being determined to exist, selecting the mode of evacuation based on the one or more results of previous evacuations; and in response to the one or more results of previous evacuations being determined not to exist, selecting the mode of evacuation based on a comparison of current data with historical data at a current location, a comparison of current speed data with historical speed data at the current location, and a comparison of a current environment condition with a historical environment condition at the current location.

* * * * *